US011190307B2

(12) United States Patent
Lee et al.

(10) Patent No.: US 11,190,307 B2
(45) Date of Patent: Nov. 30, 2021

(54) METHOD FOR RECEIVING DATA BY USING 2D CHANNEL-BASED TRANSMISSION SCHEME, AND APPARATUS THEREFOR

(71) Applicant: LG ELECTRONICS INC., Seoul (KR)

(72) Inventors: Sangrim Lee, Seoul (KR); Hojae Lee, Seoul (KR); Kwangseok Noh, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 552 days.

(21) Appl. No.: 16/096,658

(22) PCT Filed: Apr. 29, 2016

(86) PCT No.: PCT/KR2016/004534
§ 371 (c)(1),
(2) Date: Oct. 25, 2018

(87) PCT Pub. No.: WO2017/188486
PCT Pub. Date: Nov. 2, 2017

(65) Prior Publication Data
US 2021/0234647 A1  Jul. 29, 2021

(51) Int. Cl.
*H04W 72/04* (2009.01)
*H04L 5/00* (2006.01)
*H04W 52/04* (2009.01)

(52) U.S. Cl.
CPC .......... *H04L 5/0007* (2013.01); *H04L 5/0048* (2013.01); *H04W 52/04* (2013.01); *H04W 72/042* (2013.01)

(58) Field of Classification Search
CPC ... H04L 5/0048; H04L 5/0051; H04L 5/0092; H04W 24/10; H04W 52/04; H04W 72/042
See application file for complete search history.

(56) References Cited

U.S. PATENT DOCUMENTS

| | | | |
|---|---|---|---|
| 2003/0147655 A1* | 8/2003 | Shattil | H04L 27/00 398/182 |
| 2010/0080323 A1 | 4/2010 | Mueck et al. | |
| 2013/0034011 A1* | 2/2013 | Yoon | H04L 5/0048 370/252 |

(Continued)

FOREIGN PATENT DOCUMENTS

KR       101295530       8/2013

OTHER PUBLICATIONS

PCT International Application No. PCT/KR2016/004534, Written Opinion of the International Searching Authority dated Feb. 6, 2017, 23 pages.

*Primary Examiner* — Chi Ho A Lee
(74) *Attorney, Agent, or Firm* — Lee, Hong, Degerman, Kang & Waimey PC

(57) ABSTRACT

There is provided a method for receiving, by a user equipment, data using a 2-dimensional (2-D) channel-based transmission scheme, the method comprising: receiving information about allocation of a resource from a base station, wherein the 2D channel-based transmission scheme is applied to the resource; and receiving data on the resource according to the 2D channel-based transmission scheme and based on the resource allocation information.

14 Claims, 12 Drawing Sheets

(56) References Cited

U.S. PATENT DOCUMENTS

| | | | |
|---|---|---|---|
| 2014/0064106 A1* | 3/2014 | Balraj | H04W 24/10 |
| | | | 370/252 |
| 2015/0071242 A1 | 3/2015 | Vilaipornsawai et al. | |
| 2015/0282008 A1 | 10/2015 | Cao et al. | |
| 2015/0326273 A1 | 11/2015 | Rakib et al. | |
| 2016/0146922 A1* | 5/2016 | Moshfeghi | G01S 5/0252 |
| | | | 455/456.6 |
| 2017/0104568 A1* | 4/2017 | Nasiri Khormuji | H04J 11/0043 |
| 2017/0163452 A1* | 6/2017 | Breiling | H04L 25/03891 |
| 2018/0205481 A1* | 7/2018 | Shlomo | H04J 11/00 |
| 2019/0268113 A1* | 8/2019 | Lee | H04L 5/0092 |
| 2019/0342136 A1* | 11/2019 | Hadani | H04L 5/0051 |
| 2019/0372729 A1* | 12/2019 | Sasaki | H04L 27/26 |

\* cited by examiner

METHOD FOR RECEIVING DATA BY USING 2D CHANNEL-BASED TRANSMISSION SCHEME, AND APPARATUS THEREFOR

CROSS-REFERENCE TO RELATED APPLICATIONS

This application is the National Stage filing under 35 U.S.C. 371 of International Application No. PCT/KR2016/004534, filed on Apr. 29, 2016, the content of which is hereby incorporated by reference herein in their entirety.

TECHNICAL FIELD

The present invention relates to wireless communication, and more particularly, to a data reception method using a 2D channel-based transmission scheme and a device for performing the method.

BACKGROUND ART

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

DISCLOSURE

Technical Problem

A technical purpose of the present invention is to provide a method for receiving, by a user equipment, data using a 2D channel-based transmission scheme.

Another technical purpose of in the present invention is to provide user equipment for receiving data using a 2D channel-based transmission scheme.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one aspect of the present invention, there is provided a method for receiving, by a user equipment, data using a 2-dimensional (2-D) channel-based transmission scheme, the method comprising: receiving, from a base station, information on allocation of a resource to which the 2D channel-based transmission scheme is applied; and receiving data in the resource according to the 2D channel-based transmission scheme based on the resource allocation information. The resource allocation information may include information about a resource block (RB) to which the 2D channel-based transmission scheme is applied. When resource block (RB) on a time-frequency domain of the resource is transformed into a transform matrix for the 2D channel-based transmission scheme, the resource allocation information include at least one of: information about basis of a pilot signal in the transform matrix composed of a plurality of orthonormal basis; information about basis of a guard zone for channel estimation in the transform matrix; information about a set of orthonormal basis to which the data is allocated in the transform matrix; and/or information about a difference between powers the data and the pilot signal.

The method may further include obtaining a channel coefficient for each delay shift and doppler shift by performing 2D channel estimation based on the information about the basis of the pilot signal and the information on the basis of the guard zone for channel estimation. The method may further include detecting the data by determining a degree of each of the delay shift and Doppler shift for the data based on the obtained channel coefficient.

The 2D channel-based transmission scheme may include an orthogonal time, frequency and space (OTFS) scheme.

The plurality of orthonormal basis may be configured such that a product between different orthonormal basis pairs is zero. Each of the plurality of orthonormal basis may be a matrix having a unit size and may have a cyclic shift characteristic in terms of a time and frequency domain. The resource allocation information may be received through a downlink control channel. The resource allocation information may be received in a downlink control information (DCI) format included in the downlink control channel. The resource allocation information may further include information indicating that the resource allocation is related to a specific layer among layers configured for the user equipment.

In another aspect of the present invention, there is provided a user equipment (UE) for receiving data using a 2-dimensional (2-D) channel-based transmission scheme, the UE comprising: a receiver; and a processor, wherein the processor is configured to: control the receiver to receive, from a base station, information on allocation of a resource to which the 2D channel-based transmission scheme is applied; and control the receiver to receive data in the resource according to the 2D channel-based transmission scheme based on the resource allocation information. The resource allocation information may include information about a resource block (RB) to which the 2D channel-based transmission scheme is applied. A resource block (RB) on a time-frequency domain of the resource is transformed into a transform matrix for the 2D channel-based transmission scheme, the resource allocation information include at least one of: information about basis of a pilot signal in the transform matrix composed of a plurality of orthonormal basis; information about basis of a guard zone for channel estimation in the transform matrix; information about a set of orthonormal basis to which the data is allocated in the transform matrix; and/or information about a difference between powers the data and the pilot signal.

The processor may be further configured to obtain a channel coefficient for each delay shift and Doppler shift by performing 2D channel estimation based on the information about the basis of the pilot signal and the information on the basis of the guard zone for channel estimation. The processor may be further configured to detect the data by determining a degree of each of the delay shift and Doppler shift for the data based on the obtained channel coefficient.

Advantageous Effects

According to one embodiment of the present invention, related data may be efficiently received based on the resource allocation information, where the OTFS transmission scheme is applied to the resource.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Figure 1:
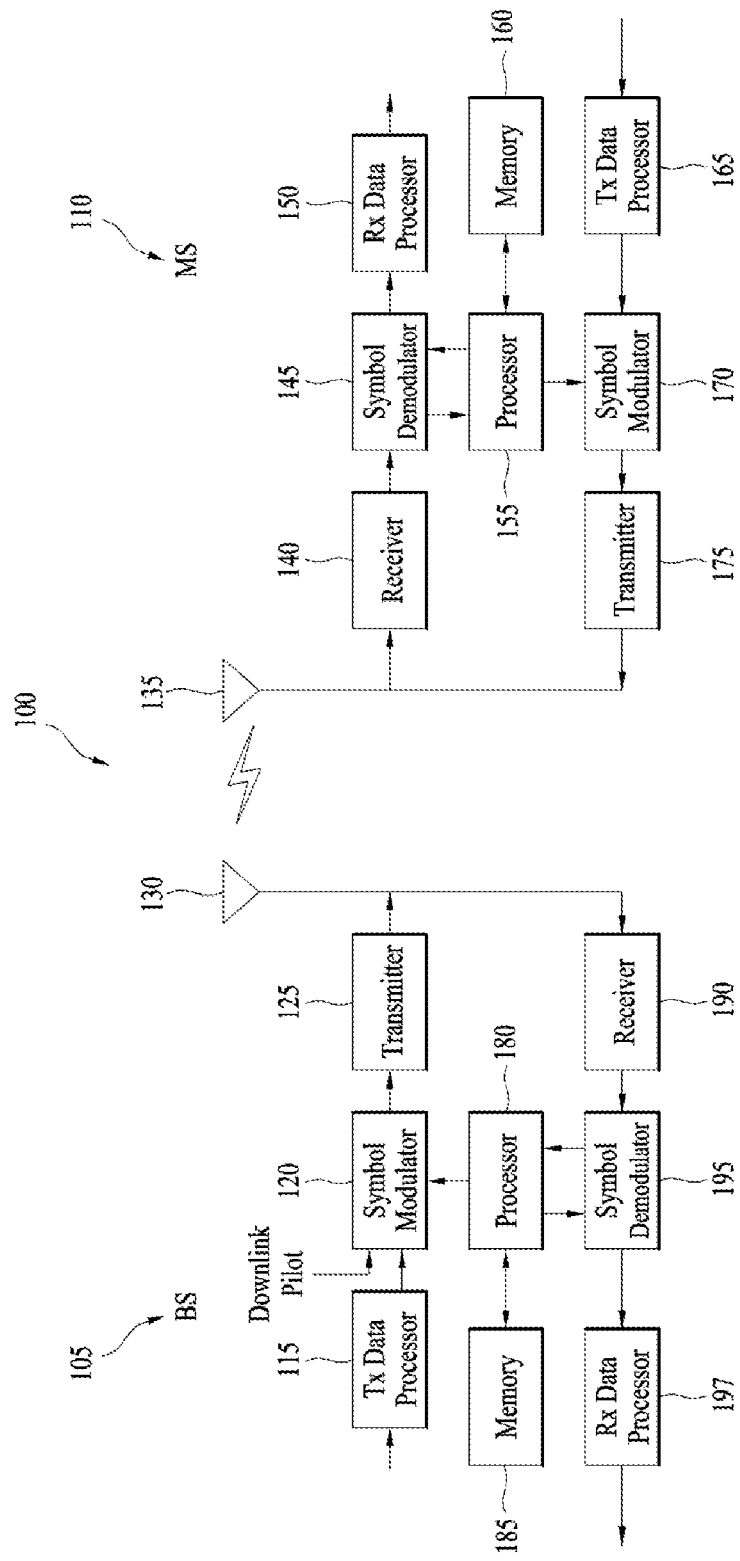
FIG. 1 is a block diagram illustrating a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

In case of performing wireless transmission between a base station and a UE, a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD).

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes new and various frame structures for a 5th generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

Figure 2:
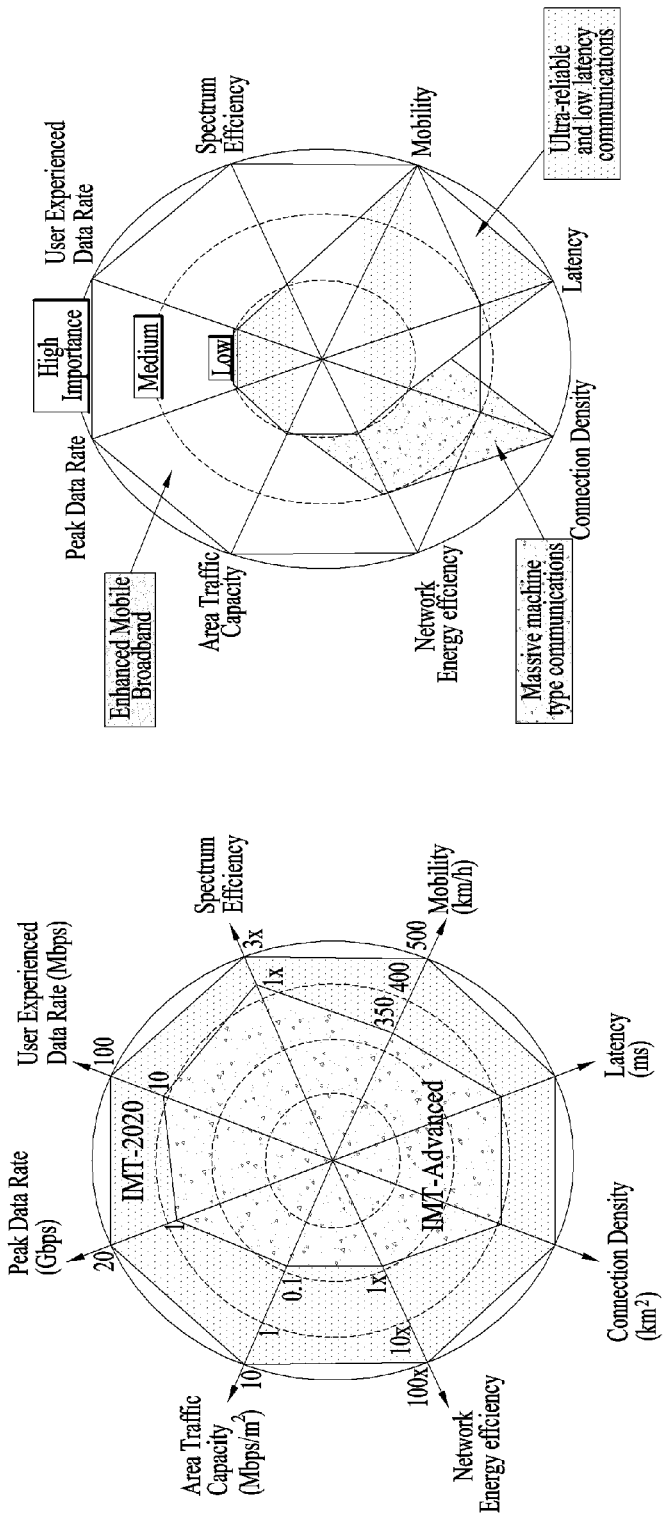
FIG. 2 shows a correlation between IMT 2020 core performance requirements for 5G and 5G performance requirements for each service scenario.

FIG. 2 is a diagram for explaining correlation between IMT 2020 core performance requirement for 5G and 5G performance requirement per service scenario.

FIG. 2 illustrates correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <10-6).

In particular, in 5G communication system, transmission technology robust against high Doppler effect due to high speed and increase of a center frequency is needed. Recently, the Orthogonal Time, Frequency and Space (OTFS) transmission scheme has been introduced to have a better performance than the legacy OFDM communication system in high Doppler situations. This technique is based on the 2D channel model. In the case of the legacy 1D channel model, the channel in the time domain changes due to the influence of Doppler. This means that the channel changes randomly in mathematical modeling. Therefore, a reference signal for measuring the channel state over time is required.

On the other hand, 2D channel modeling simultaneously analyzes a channel in terms of time and frequency domains. Compared with the 1D channel modeling, the degree of channel change due to the Doppler effect may be included in the 2D channel modeling, and, thus, the channel may be regarded as a deterministic and non-random channel.

Thus, data may be transmitted robustly using the OTFS, a new transmission technique based on the 2D channel modeling, even on a channel having a change in the time domain and frequency selective characteristics in the frequency domain.

Figure 3:
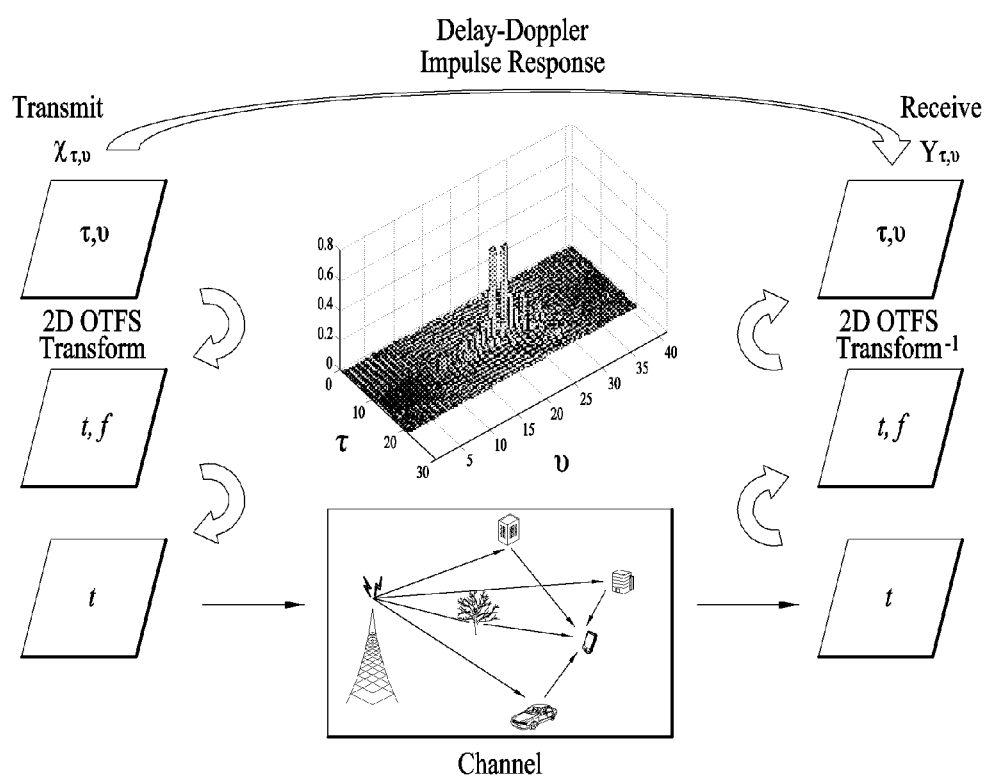
FIG. 3 is an illustration of an OTFS transmission mechanism according to the OTFS-2D approach.

FIG. 3 is an illustration of an OTFS transmission mechanism according to the OTFS-2D approach.

As shown in FIG. 3, transmission is performed based on the Delay-Doppler channel modeling, that is, 2D channel modeling. The OTFS transmission scheme is an example of a transmission scheme based on a 2D (Delay, Doppler) channel model. In the present disclosure, the OTFS is described below as an example.

Figure 4:
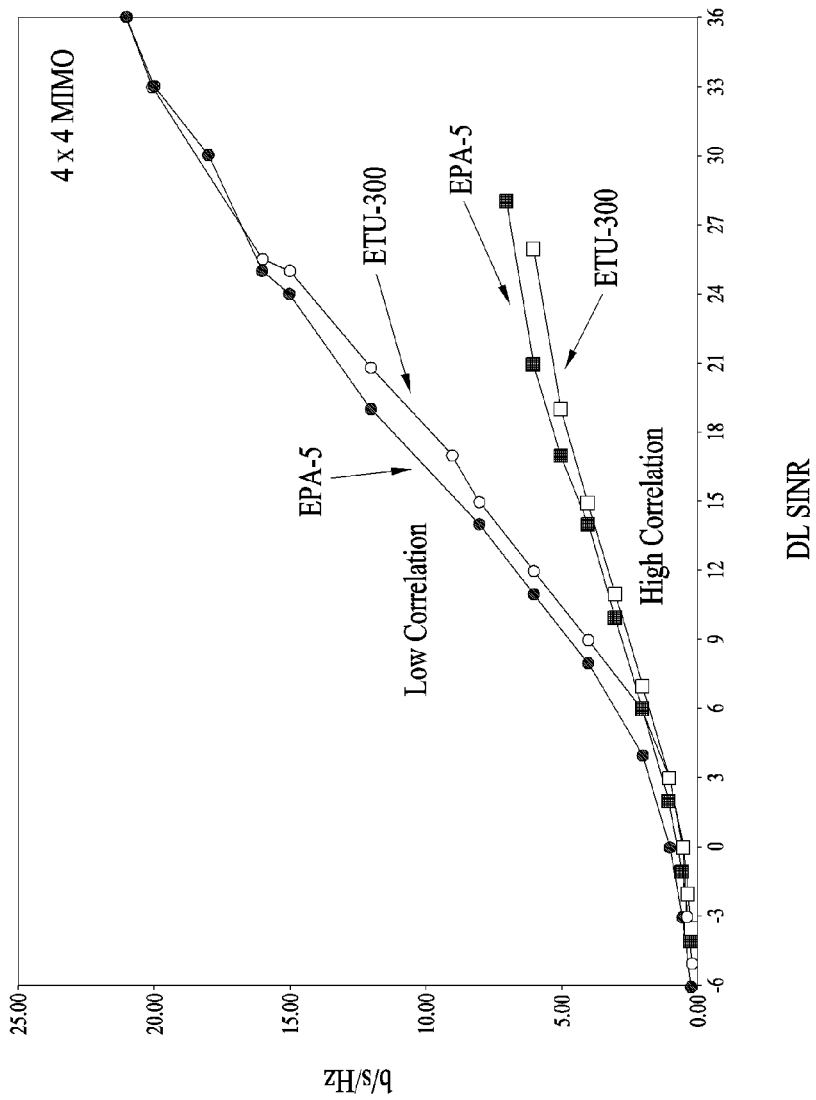
FIG. 4 shows a spectral efficiency of OTFS.

FIG. 4 shows a spectral efficiency of OTFS.

As shown in FIG. 4, it may be seen that EPA-5 (Doppler 5 Hz) and ETU-300 (Doppler 300 Hz) exhibit almost similar performances. That is, even when the delay and the Doppler increase, the OTFS transmission technology exhibits almost no performance deterioration.

Figure 5:
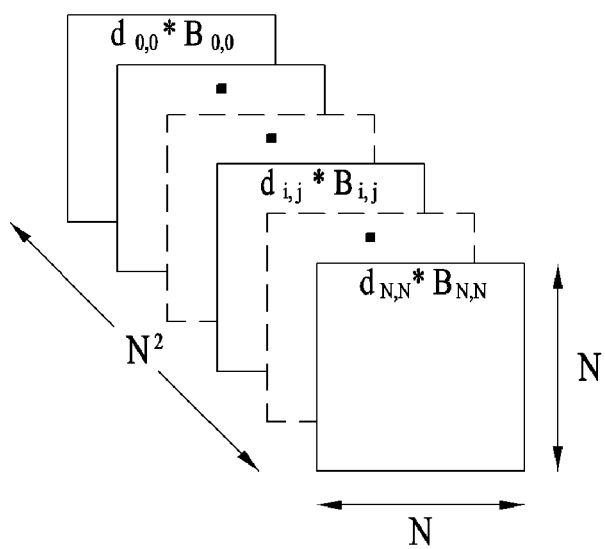
FIG. 5 is a diagram illustrating a method for performing OTFS transform by a OTFS transmission stage.

FIG. 5 shows a method of performing an OTFS transform by an OTFS transmission stage.

Figure 6:
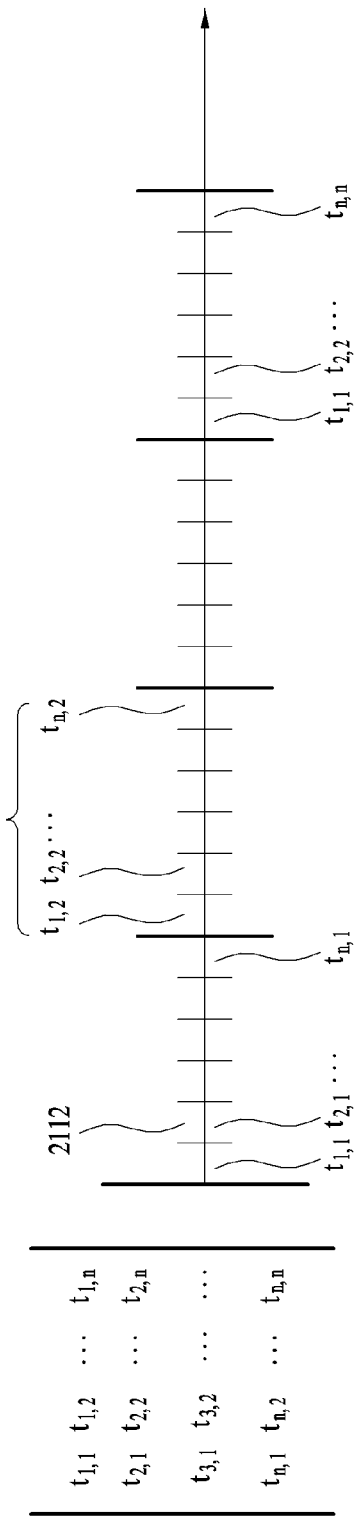
FIG. 6 shows a transmission example on the time axis of an OTFS transformed matrix.

Referring to FIG. 5, a total size of N×N data is assumed. Each data d(i, j) is multiplied by B (i, j) as an orthonormal basis having a size of N×N, and, thus, is transformed. Then, as shown in FIG. 6, columns of a sum matrix of the thus-transformed matrices are mapped to each time domain and are transmitted. Herein, the orthonormal basis may also be referred to as the OTFS basis.

The orthonormal basis or OTFS basis may have a matrix form and may be represented as an N×N OTFS transform matrix, where N may be expressed as a power of 2. A row index of the OTFS transform matrix means a cyclic frequency shift index, while a column index of OTFS transform matrix means a cyclic time shift index. The orthonormal basis or OTFS basis may have orthonormal or near-orthonormal relationship in terms of 2-dimension, and may have cyclic time shift and cyclic frequency shift relationship.

Due to the delay spread and Doppler effect caused by the channel environment, orthonormal basis or OTFS basis used between symbols transmitted in an overlapping fashion may be impaired or inter-symbol interference (ISI) due to near-orthonormal degree may occur.

As for the orthonormal basis or OTFS basis, a product between different basis pairs is 0. Each basis is a matrix with a unit size and has cyclic shift characteristics in terms of the time/frequency domains. The basis may be called a time/frequency cyclic shift orthonormal matrix.

FIG. 6 shows a transmission example on a time axis of an OTFS-transformed matrix.

As shown in FIG. 6, each modulated symbol (e.g., QAM symbol) is transmitted on an orthonormal basis. A receiving stage performs an opposite procedure to the transmission procedure based on the transmitted orthonormal basis to perform demodulation. In this connection, in order to perform the demodulation, a procedure is needed to check how much delay and Doppler have influenced the transmitted signal on a transmission path basis via 2D channel estimation.

The procedure is solved using characteristics, that is, cyclically time-shifted or frequency-shifted waveforms of orthonormal basis. In other words, the transmission stage uses a single basis to send a pilot symbol, and the receiving stage finds out how much delay and Doppler have affected the symbol. How the receiving stage determines the effect by the delay and Doppler may be as follows: the channel estimation may be made by blanking basis corresponding to maximum delay and maximum Doppler values relative to the basis used as the pilot symbol.

Figure 7:
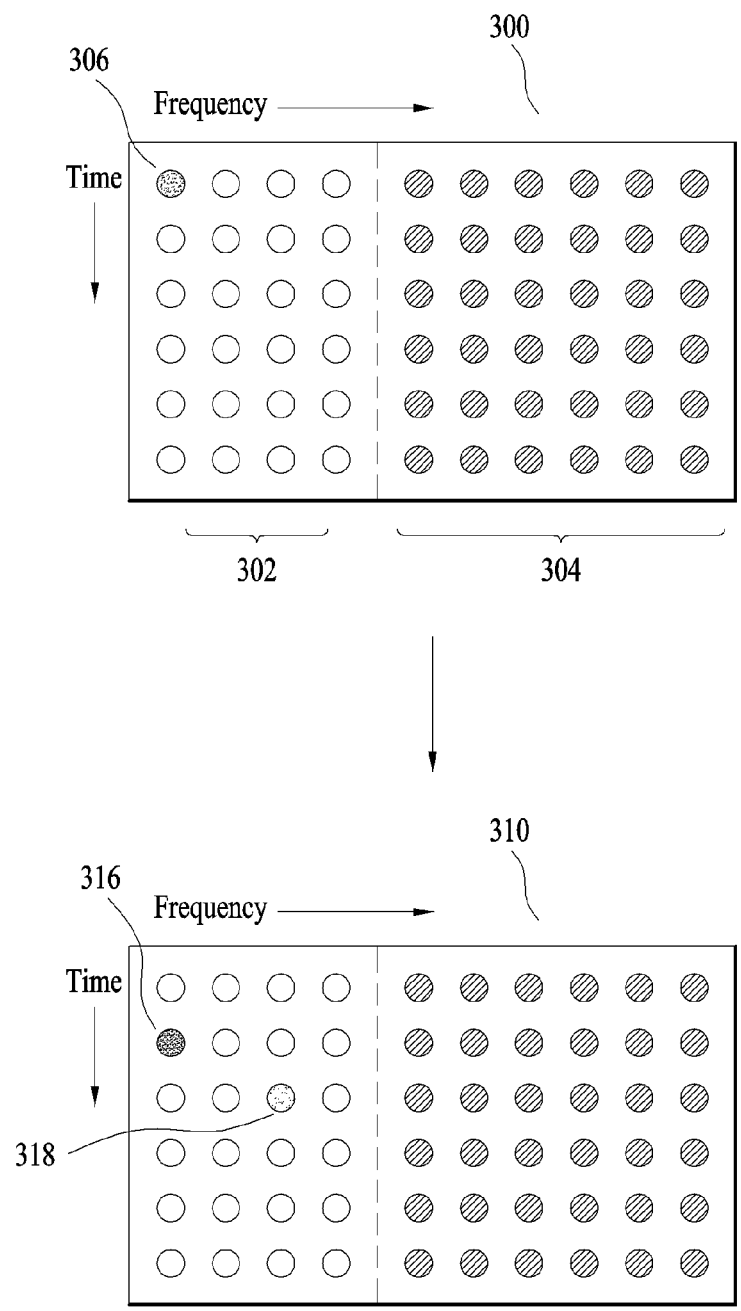
FIG. 7 shows an example of 2D channel estimation using a pilot signal on a OTFS transformed time-frequency domain.

FIG. 7 shows an example of 2D channel estimation using a pilot on a OTFS transformed time-frequency domain.

Referring to the time-frequency domain as shown at a top of FIG. 7, a pilot symbol is carried on a basis 306, and basis around the pilot symbol is blanked for channel estimation. Referring to the time-frequency domain shown at a bottom of FIG. 7, it may be seen that there are two channel paths after the 2D channel estimation. A first path 316 represents a channel with no Doppler effect and with a delay by one sample, while a second path 318 represents a channel in which only two samples of delay occur and a Doppler shift occurs by two. (In this connection, the sample refers to a smallest unit at which the receiving stage of a system using OTFS can detect the delay or Doppler. The channel estimation may allow a channel experienced by the symbol in the domain in which the data is sent to be known. Based on this knowledge, the signal as sent is detected via an equalizer.

In order to apply the above-mentioned OTFS to a system, selecting an orthonormal basis for the 2D channel estimation may be essential. According to the present invention, a signaling technique necessary between the user equipment and the base station in the OTFS transmission scheme will be proposed.

First, the downlink environment is considered. For purposes of illustration, a description will be made based on a 5G self-contained frame (or subframe) structure. However, the present method is not limited to the 5G self-contained frame (or subframe) structure.

Figure 8:
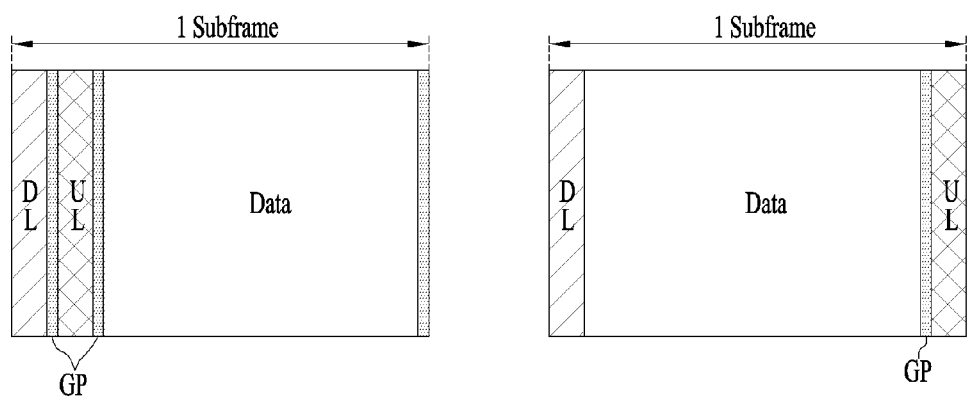
FIG. 8 is an illustration of a 5G self-contained frame (or subframe) structure.

FIG. 8 is an illustration of a 5G self-contained frame (or subframe) structure.

FIG. 8 shows a self-contained subframe or frame structure proposed to satisfy a low delay requirement among the 5G performance requirements. In the self-contained subframe (or frame) structure based on TDD (Time Division Duplex), resource regions for downlink and uplink is present in one subframe, and a guard period (GP) to solve the downlink/uplink interference problem, and a resource region for data transmission are present therein.

In the self-contained subframe structure shown on the left side of FIG. 8, the subframe is configured in an order of resource regions for downlink-uplink-data, and there is a GP between these resource regions. In the self-contained subframe structure shown on the right side of FIG. 8, a subframe is configured in an order of resource regions for downlink-data-uplink and there is a GP only in front of the resource region for the uplink.

Signaling Scheme Required Between User Equipment and Base Station in OTFS Transmission Scheme Embodiment 1

The base station uses a control channel to provide information about not only a resource region for the user equipment but also a location of a pilot symbol, a guard zone, and a set of basis using data.

Figure 9:
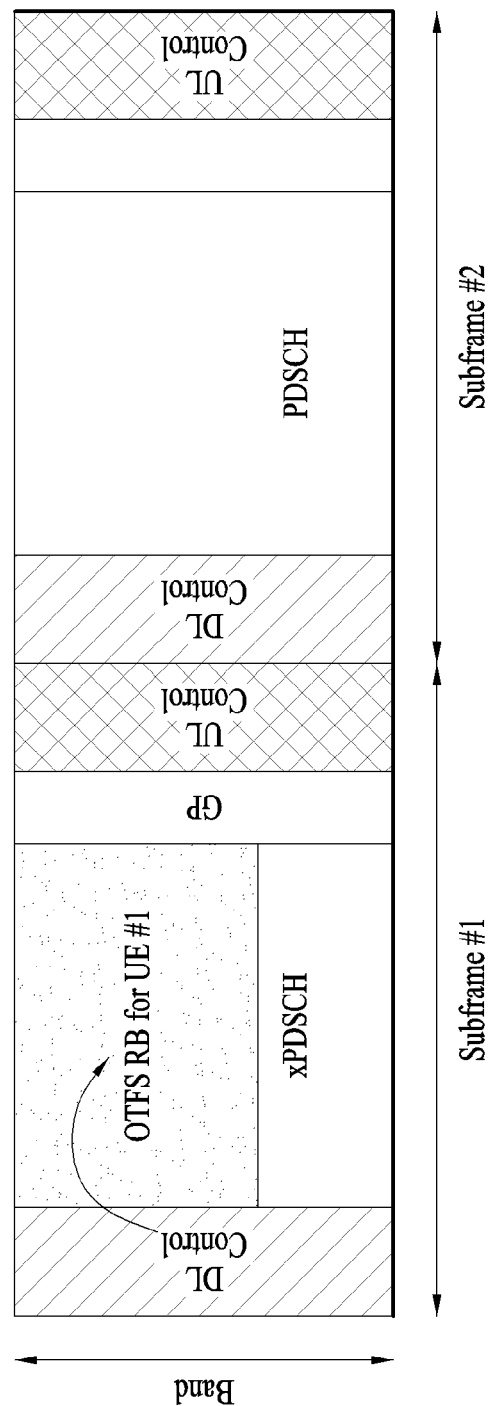
FIG. 9 shows an example of allocating an RB (Resource Block) to use an OTFS transmission scheme to a data region.

FIG. 9 shows an example in which an RB (Resource Block) is allocated to a data region to use the OTFS transmission scheme.

FIG. 9 shows an example in which an OTFS transmission scheme is applied to a data region in the self-contained frame structure. A user equipment 1 (UE 1) detects control information allocated thereto from a downlink control region (or a downlink control channel region) and then finds out a region allocated to the user equipment 1 within the data region.

Figure 10:
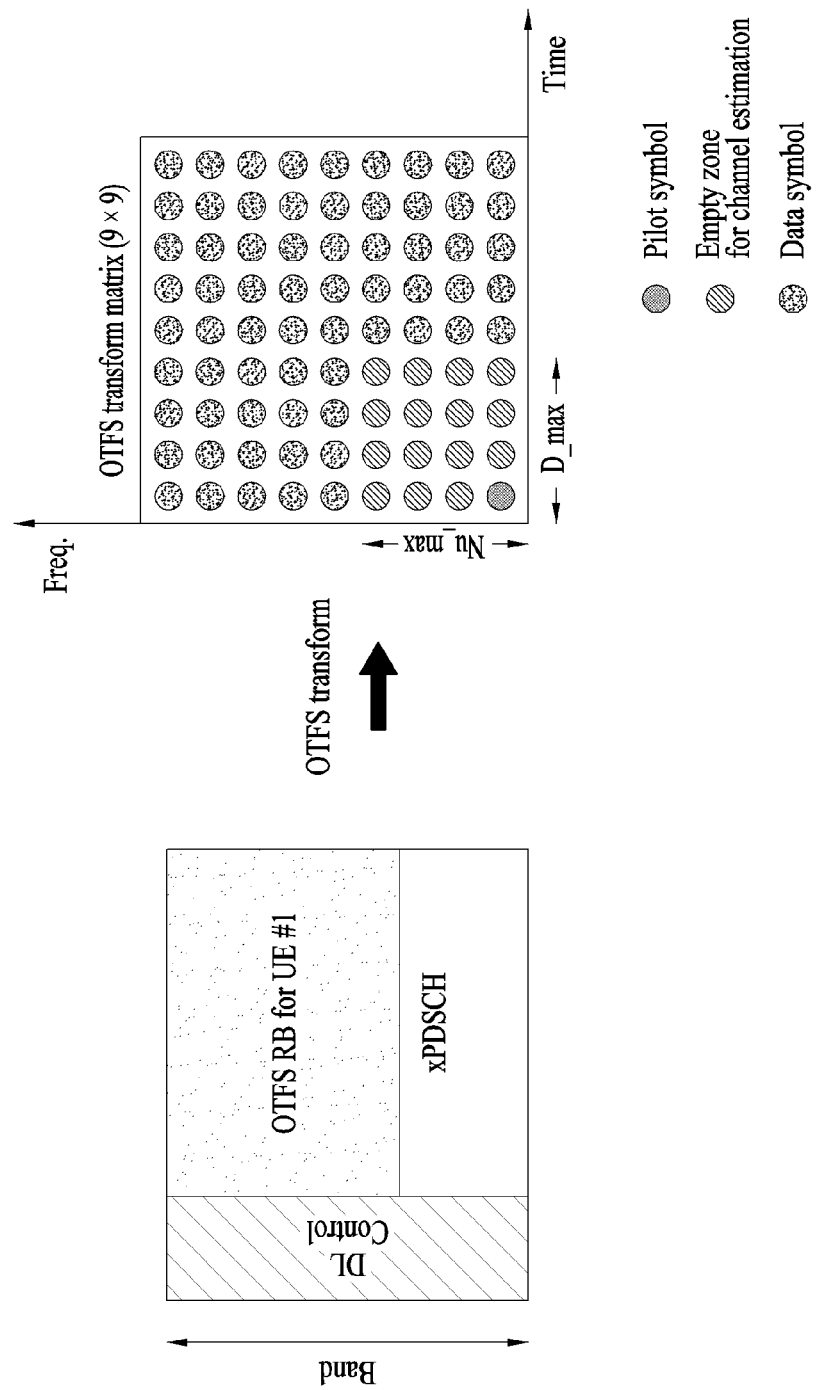
FIG. 10 shows an example of allocation of pilot and data in OTFS RB.

FIG. 10 shows an example of allocation of pilot and data in OTFS RB.

FIG. 10 shows mapping of pilot and data in an OTFS transform domain to a OTFS RB region. As shown in the right side of FIG. 10, an OTFS matrix may be generated using a total of 9×9=81 basis, a pilot is allocated to a basis $B_{0,0}$ where both a time shift and a frequency shift are 0. Basis $B_{0,0}$, $B_{0,1}$, $B_{1,1}$, ..., $B_{4,4}$ of 4×4−1=15 with a maximum delay (D_max) and a maximum Doppler (Nu_max) are blanked or empty for the channel estimation. For data transmission, data is allocated to the remaining 65 basis.

The base station needs to notify an user equipment 1 (UE1) of following four pieces of information in addition to existing information such as existing MCS, RB, etc., using a downlink control channel (for example, PDCCH or ePDCCH). In this connection, the above-mentioned four pieces of information may be included and transmitted in a new DCI (Downlink Control Information) format within the PDCCH or the ePDCCH. The new DCI format may be transmitted on a conventional OFDM or OTFS basis.

1) basis information of the pilot signal (or reference signal) (for example, $B_{0,0}$)
2) basis information of the guard zone for channel estimation (for example, $B_{1,0}$, $B_{0,1}$, $B_{1,1}$, ..., $B_{4,4}$)
3) Information about a basis set to which data is assigned (for example, $B_{5,0}$, $B_{5,1}$, $B_{5,2}$, ..., $B_{5,9}$, ...)
4) Information on difference between powers for data and pilot signal A procedure for the user equipment 1 to detect data based on the above four pieces of information is as follows. First, the user equipment 1 performs 2D channel estimation based on pilot position and guard zone position information. That is, the UE 1 may find a channel coefficient for a delay for each path and each Doppler shift by multiplying the received signal of a corresponding resource from $B_{0,0}$ to $B_{4,4}$. The UE 1 may know a degree to which each data is distorted by the delay and Doppler shift, based on this channel coefficient. The degree may be used to distinguish an original signal via an entire receiving equalizer. The user equipment 1 needs to know information about the difference between the powers for data and the pilot signal in order that the UE 1 may demodulate the received signal.

Figure 11:
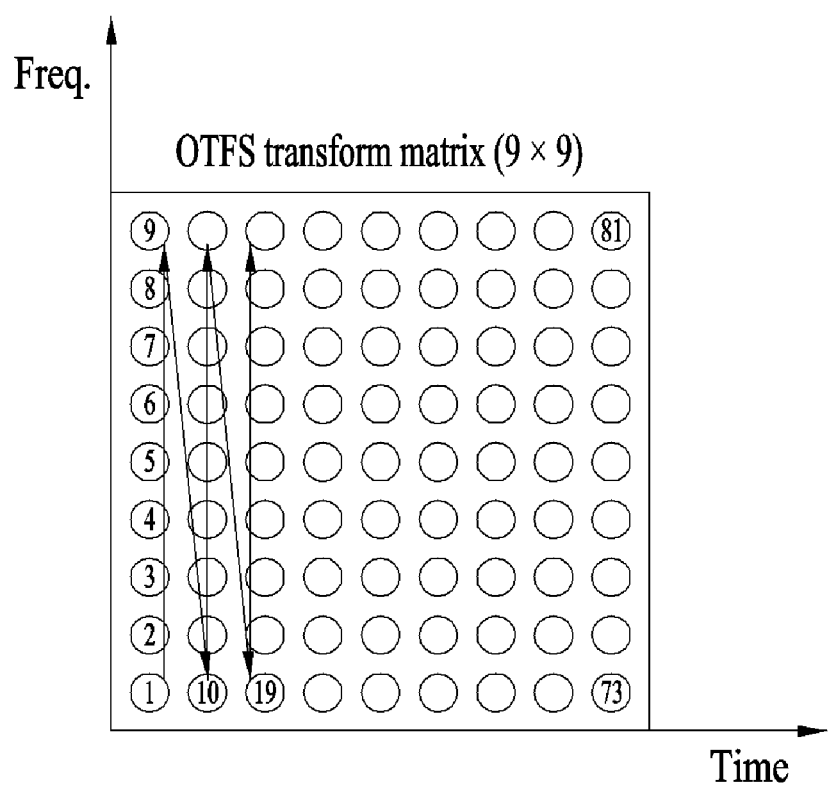
FIG. 11 shows an example of numbering of basis.

FIG. 11 shows an example of numbering of the basis.

The base station may inform the user equipment of information about the pilot position, the guard zone for channel estimation, and a basis set to which the data are allocated on a downlink control channel using a predetermined method. In one example, FIG. 9 shows an example of using the numbering to inform the above information.

As shown in FIG. 11, an example in which the frequency domain is first numbered is shown. Referring to FIG. 11, it may be informed that the basis number for the pilot position is 1, the basis number for the guard zone is 31, and the base number for the data is {5 to 9, 14 to 18, 23 to 27, 32 to 81}. In another method, it may be informed that a bitmap format is used. In this case, the pilot position is (0,0), the guard zone is (4,4), the data zone is each vertex (5,0), (0,5), (9,9), (5,9), (9,5), (5,5). In addition, various schemes may be used. Further, the numbering method of the basis set may vary from cell to cell.

Further, the information on the pilot position and the guard zone among the above information may be set to in an user equipment-unspecified manner but cell-specific manner. The base station may inform the user equipment about the pilot position and guard zone via system information or higher layer signaling (e.g., RRC signaling).

Embodiment 2

In the case of MIMO transmission, information about the pilot position and the guard zone region for each layer may be transmitted by the base station to the user equipment using the downlink control channel.

Figure 12:
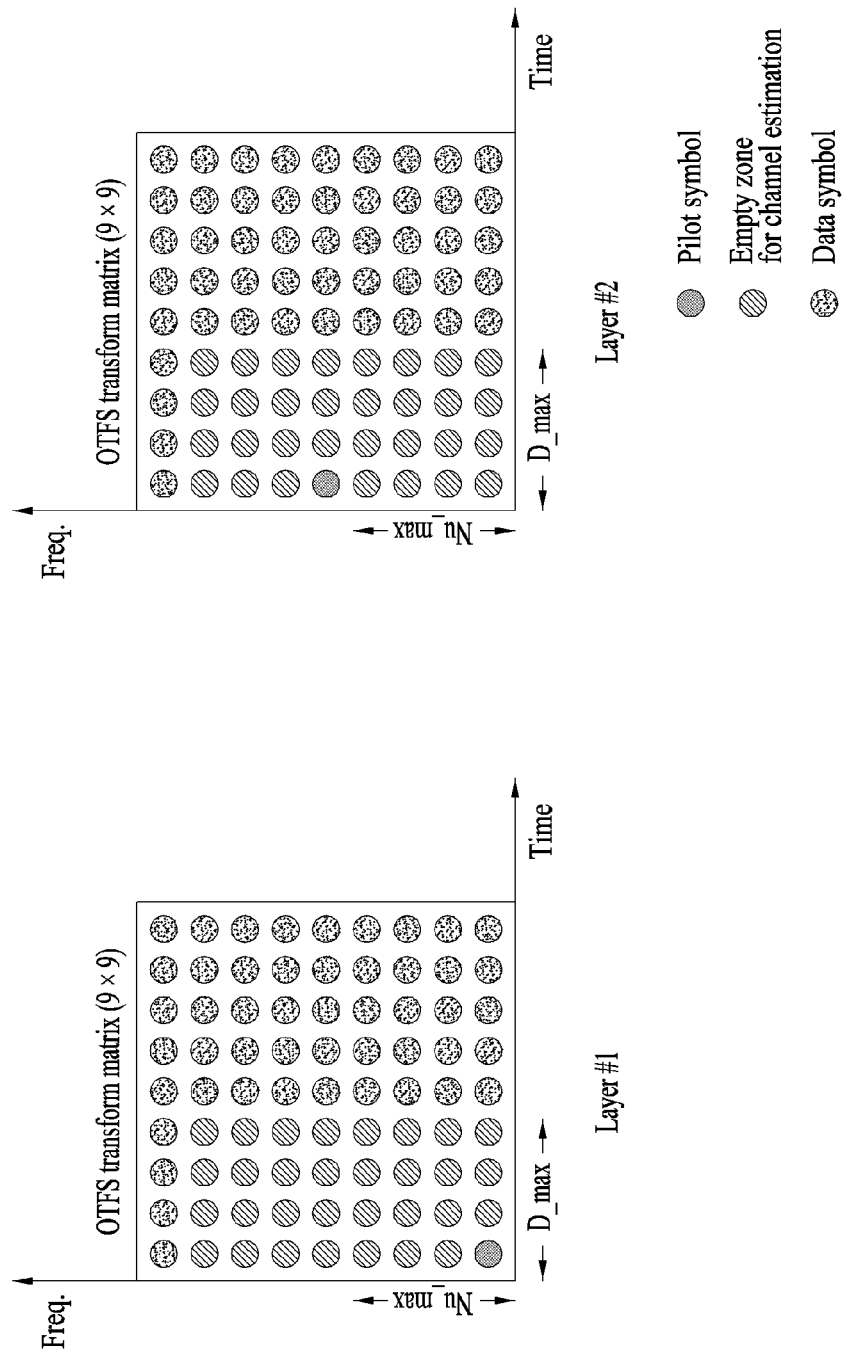
FIG. 12 shows an example of informing a pilot position and a region of a guard zone for each layer in case of 2-layers transmission.

FIG. 12 shows an example in which the pilot position and the guard zone region for each layer are indicated in the case of two layers transmission.

FIG. 12 shows an example of OTFS-based pilot and guard zone allocation in the two layers transmission. That is, the base station informs the user equipment of each pilot position and guard zone allocation region for each layer. When the OTFS transmission is combined with multiple users, the layer #1 may be applied as information for the user equipment 1 (UE1), and the layer #2 may be applied as information for the user equipment 2 (UE2). However, in the case of a single user, only one guard zone may be indicated.

Even in case of uplink transmission, the base station may inform the user equipment of the control information (e.g., UL grant) via a downlink control channel in the same manner as in the downlink transmission.

Embodiment 3

In the case of downlink, D_max and Nu_max values for setting the guard zone are fed back using the control channel.

The user equipment may measure the delay and Doppler values for the downlink via the channel estimation and may feed back the maximum values thereof to the base station. Based on the feedback information, the base station may schedule the corresponding user equipment and set a guard zone. The feedback information may be communicated via, for example, a physical uplink control channel (PUCCH) or higher layer signaling (RRC signaling).

In the case of uplink, the base station may measure the maximum delay and Doppler using a signal such as SRS (Sounding Reference Signal). Thereafter, the base station may transmit a guard zone region to be used by the user equipment using a physical channel such as a PDCCH or an upper layer signal to the UE.

The signaling scheme required between the user equipment and the base station in the OTFS transmission scheme as described above may allow transmission based on OTFS to be performed more efficiently.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for receiving data using a transmission scheme based on a 2D channel and the device for performing the method are applied to various wireless communication systems such as 3GPP LTE-A and 5G communication systems in industry.

What is claimed is:

1. A method for receiving by a user equipment (UE) data using a 2-dimensional (2D) channel-based transmission scheme, the method comprising:
   receiving, from a base station, information on allocation of a resource to which the 2D channel-based transmission scheme is applied; and
   receiving data in the resource according to the 2D channel-based transmission scheme based on the resource allocation information,
   wherein the resource allocation information includes information related to a resource block (RB) to which the 2D channel-based transmission scheme is applied,
   wherein the information related to the RB comprises information related to position of a pilot signal and information related to a region of a guard zone, and
   wherein the region of the guard zone is determined by the base station based on a maximum delay value and a maximum Doppler value for downlink fed back from the UE.

2. A The method of claim 1, wherein when a resource block (RB) on a time-frequency domain of the resource is transformed into a transform matrix for the 2D channel-based transmission scheme, the resource allocation information includes at least one of:
   information about basis of the pilot signal in the transform matrix composed of a plurality of orthonormal basis;
   information about basis of the guard zone for channel estimation in the transform matrix;
   information about a set of orthonormal basis to which the data is allocated in the transform matrix; and/or
   information about a difference between power of the data and power of the pilot signal.

3. The method of claim 2, further comprising:
   obtaining a channel coefficient for each delay shift and doppler shift by performing 2D channel estimation based on the information about the basis of the pilot signal and the information on the basis of the guard zone for channel estimation.

4. The method of claim 3, further comprising:
   detecting the data by determining a degree of each of the delay shift and Doppler shift for the data based on the obtained channel coefficient.

5. The method of claim 1, wherein the 2D channel-based transmission scheme includes an orthogonal time, frequency and space (OTFS) scheme.

6. The method of claim 2, wherein the plurality of orthonormal basis is configured such that a product between different orthonormal basis pairs is zero.

7. The method of claim 2, wherein each of the plurality of orthonormal basis is a matrix having a unit size and has a cyclic shift characteristic in terms of a time and frequency domain.

8. The method of claim 1, wherein the resource allocation information is received through a downlink control channel.

9. The method of claim 8, wherein the resource allocation information is received in a downlink control information (DCI) format included in the downlink control channel.

10. The method of claim 1, wherein the resource allocation information further includes information indicating that the resource allocation is related to a specific layer in layers configured for the user equipment.

11. A user equipment (UE) for receiving data using a 2-dimensional (2-D) channel-based transmission scheme, the UE comprising:
    a receiver; and
    a processor configured to:
    control the receiver to receive information on allocation of a resource to which the 2D channel-based transmission scheme is applied to the resource; and
    control the receiver to receive data in the resource according to the 2D channel-based transmission scheme based on the resource allocation information,
    wherein the resource allocation information includes information related to a resource block (RB) to which the 2D channel-based transmission scheme is applied,
    wherein the information related to the RB information comprises information related to position of a pilot signal and information related to a region of a guard zone, and wherein the region of the guard zone is determined by a base station based on a maximum delay value and a maximum Doppler value for downlink fed back from the UE.

12. The UE of claim 11, wherein when a resource block (RB) on a time-frequency domain of the resource is transformed into a transform matrix for the 2D channel-based transmission scheme, the resource allocation information include at least one of:

information about basis of the pilot signal in the transform matrix composed of a plurality of orthonormal basis;

information about basis of the guard zone for channel estimation in the transform matrix;

information about a set of orthonormal basis to which the data is allocated in the transform matrix; and/or information about a difference between power of the data and power of the pilot signal.

13. The UE of claim 11, wherein the processor is further configured to obtain a channel coefficient for each delay shift and doppler shift by performing 2D channel estimation based on the information about the basis of the pilot signal and the information on the basis of the guard zone for channel estimation.

14. The UE of claim 13, wherein the processor is further configured to detect the data by determining a degree of each of the delay shift and Doppler shift for the data based on the obtained channel coefficient.

* * * * *